(12) United States Patent
Poutre

(10) Patent No.: US 7,770,657 B2
(45) Date of Patent: Aug. 10, 2010

(54) MULTI-SPEED SWEEP HAVING PROGRESSIVELY AGGRESSIVE, NON-FLAT SOIL CONTACTING SURFACES

(75) Inventor: Benoit Jocelyn Poutre, Elkhart, IA (US)

(73) Assignee: Deere & Company, Moline, IL (US)

( * ) Notice: Subject to any disclaimer, the term of this patent is extended or adjusted under 35 U.S.C. 154(b) by 1046 days.

(21) Appl. No.: 10/846,115

(22) Filed: May 14, 2004

(65) Prior Publication Data

US 2005/0252668 A1  Nov. 17, 2005

(51) Int. Cl.
*A01B 39/20* (2006.01)
(52) U.S. Cl. ....................................... 172/724
(58) Field of Classification Search .............. 172/724
See application file for complete search history.

(56) References Cited

U.S. PATENT DOCUMENTS

| | | | | |
|---|---|---|---|---|
| 104,754 A | * | 6/1870 | Miner | 172/730 |
| 147,633 A | | 2/1874 | Haiman | |
| 1,648,843 A | * | 11/1927 | Francis | 172/730 |
| 2,351,388 A | | 6/1944 | Baxter | |
| 4,583,599 A | * | 4/1986 | Anderson | 172/730 |
| 4,787,462 A | | 11/1988 | Nichols | 172/730 |
| 4,850,435 A | * | 7/1989 | Morris et al. | 172/730 |
| 5,259,461 A | | 11/1993 | Cochrane | 172/730 |
| 5,531,277 A | * | 7/1996 | Noonan et al. | 172/730 |
| 5,979,568 A | | 11/1999 | Parish | 172/724 |
| 6,119,321 A | * | 9/2000 | Bruce | 29/14 |
| 6,508,147 B1 | * | 1/2003 | Bruce | 76/113 |
| D480,734 S | * | 10/2003 | Poutre | D15/29 |
| 6,684,963 B1 | | 2/2004 | Poutre et al. | 172/750 |

* cited by examiner

*Primary Examiner*—Alicia M Torres

(57) ABSTRACT

An agricultural tillage sweep providing good soil action without ridges in the soil surface at both high and low speed operation in different soil conditions. Wings extending outwardly and rearwardly from a leading nose portion include non-flat soil contacting surfaces defining opposed outwardly and upwardly directed surfaces converging in the forward direction. The surfaces, which can be concave upwardly and outwardly, define soil throwing action that progressively increase in the rearward direction. A shallow sweep leading area provides greater upward soil lift and lesser outward soil throw compared to trailing areas. At high speeds, the leading area provides vertical lift and substantial outward throw of soil, and at lower speeds the progressive action surfaces provide additional outward throw of soil to facilitate necessary soil mixing action.

8 Claims, 5 Drawing Sheets

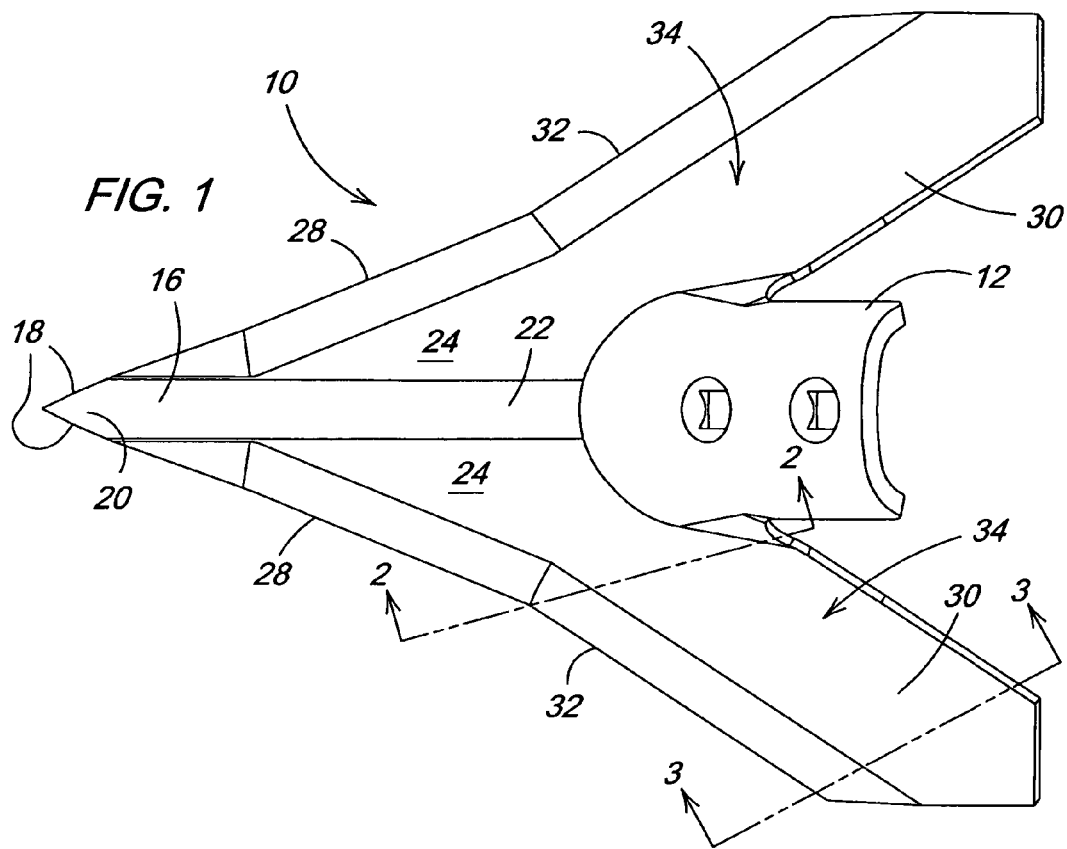
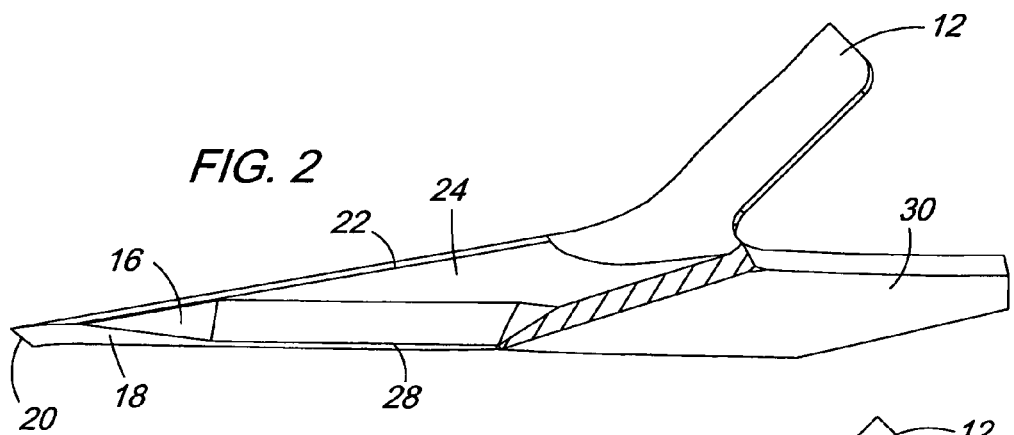
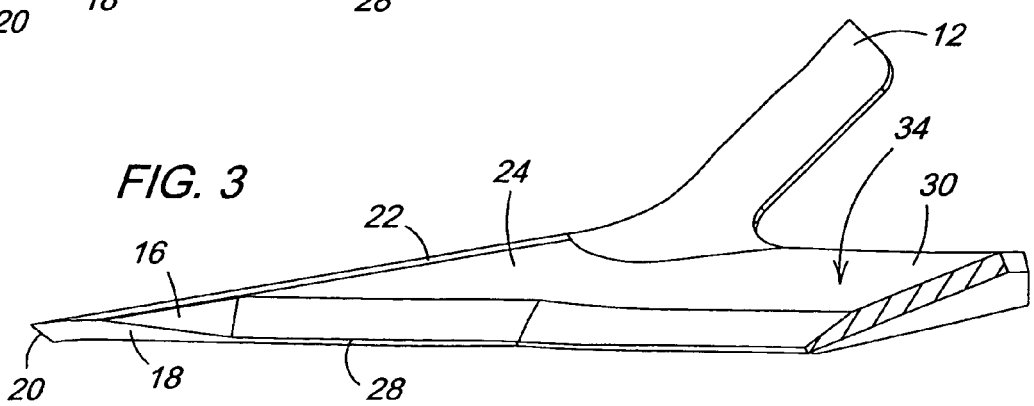

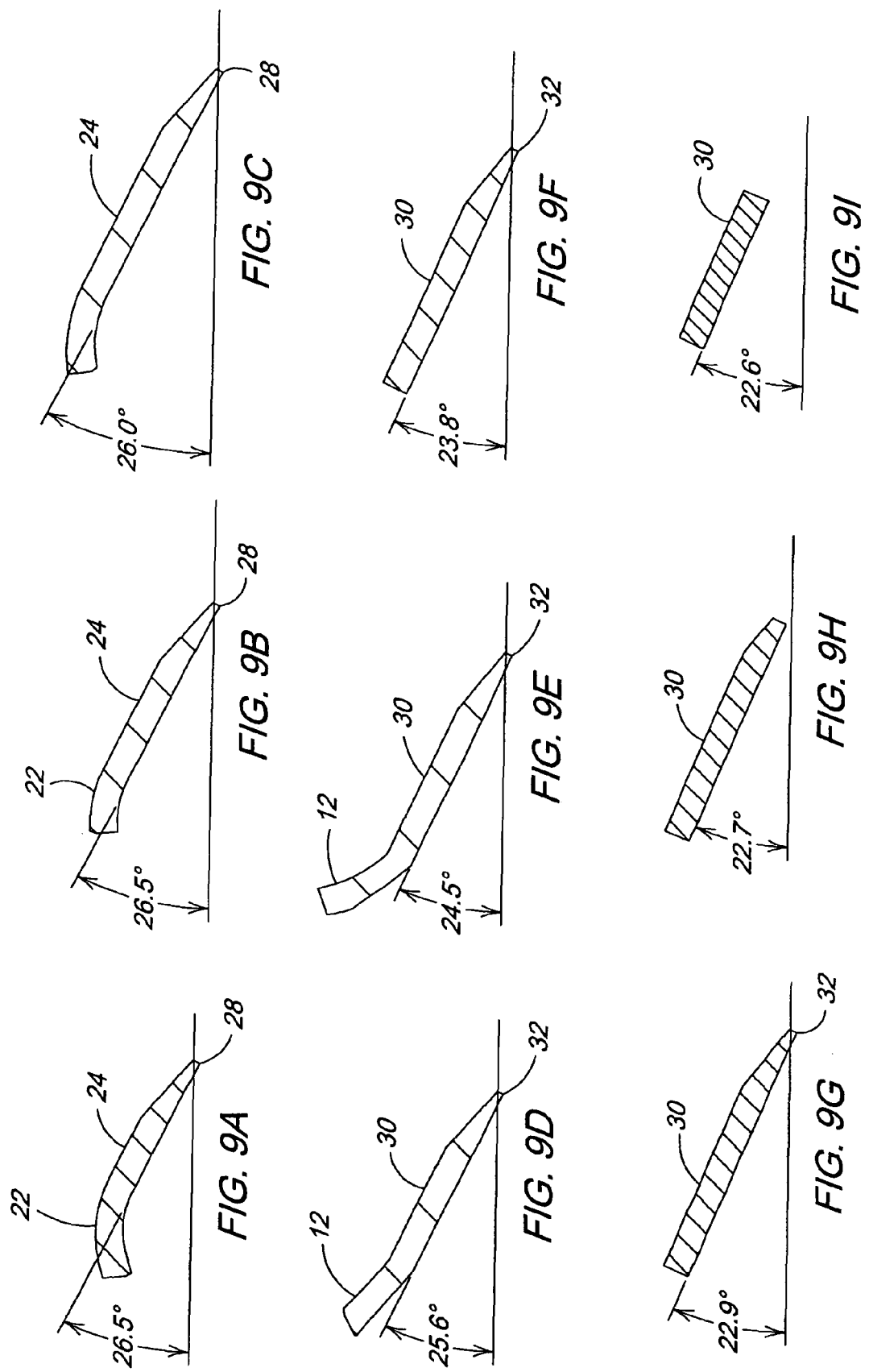

ratio
MULTI-SPEED SWEEP HAVING PROGRESSIVELY AGGRESSIVE, NON-FLAT SOIL CONTACTING SURFACES

FIELD OF THE INVENTION

The present invention relates to tillage sweeps and more specifically to tillage sweeps with contact surfaces angled for improving soil and trash flow characteristics over a range of operating speeds and ground conditions.

BACKGROUND OF THE INVENTION

Soil flow is a primary consideration when designing an agricultural sweep for field cultivators, row crop cultivators and chisel plows. Many previously available sweeps include a "V" shaped leading structure with flat side blades or wing portions. Such a shape generates considerable side soil flow. The side flow tends to result in an uneven soil surface if the sweep is operated at high speeds. Flatter sweeps with a less pronounced "V" shape reduce the side flow at high speeds, but when the sweeps are operated at slower speeds material movement often is insufficient to achieve the desired soil action and trash flow for optimum tillage. The reduced soil lift of flatter sweeps adversely affects soil entry and penetration characteristics. The sweep load distribution, determined in large part by the sweep surface configuration, affects sweep wear, and uneven wear caused by poor load distribution necessitates more frequent sweep replacement.

SUMMARY OF THE INVENTION

It is therefore an object of the present invention to provide an improved tillage sweep for an agricultural implement. It is another object of the present invention to provide such a sweep which overcomes most or all of the aforementioned problems.

It is a further object of the present invention to provide an improved tillage sweep which has better soil and trash flow characteristics than at least many of the previously available sweeps. It is another object to provide such a sweep having such improved characteristics over a wide range of operating speeds and soil conditions. It is yet another object of the present invention to provide an improved tillage sweep having improved penetration, load distribution and wear characteristics.

It is a further object of the present invention to provide a tillage sweep having wings with non-flat surfaces to provide better soil surface uniformity and trash flow characteristics over a wide range of operating speeds and soil conditions. It is another object to provide such a sweep having slightly concave soil contacting surfaces defining a ramp-like structure with progressively increasing soil action in the rearward and outward direction.

An agricultural sweep includes a stem portion, a leading nose portion extending forwardly from the stem portion providing soil lift and some outward soil throw, and non-flat wings extending outwardly and rearwardly from the leading nose portion. A contacting surface is defined on the wings having an upward concavity. The soil contacting surface defines a shape analogous to a skateboard ramp and progressively increases the ability of the wings to throw soil outwardly in the rearward direction. The leading portion of the sweep provides greater upward lift and lesser outward soil throw compared to the trailing area. At high speeds, substantial outward soil throw is provided by the leading portion of the sweep, and the ramp effect of the concave wing surfaces is diminished since the soil tends to lift more over the concavity. However, at slower speeds or in heavier soil conditions more soil engages the trailing area, and the ramp effect provides additional outward throw of soil facilitate better soil and trash flow. The upward lift of the forward portion of the angled surface improves soil penetration. The surface shape also improves soil force load distribution for extended useful sweep life. Good soil and trash flow characteristics are maintained over a wider range of speeds and in various ground conditions resulting in a smoother soil surface compared to flat-surfaced sweeps.

BRIEF DESCRIPTION OF THE DRAWINGS

FIG. 1 is a top view of a tillage sweep having progressively increasing surface action in the rearward and outward direction.

FIG. 2 is a view taken generally along lines 2-2 of FIG. 1.

FIG. 3 is a view taken generally along lines 3-3 of FIG. 1.

FIGS. 9A-9I are section views taken generally along the corresponding lines of FIG. 8.

DESCRIPTION OF THE PREFERRED EMBODIMENT

Figure 4:
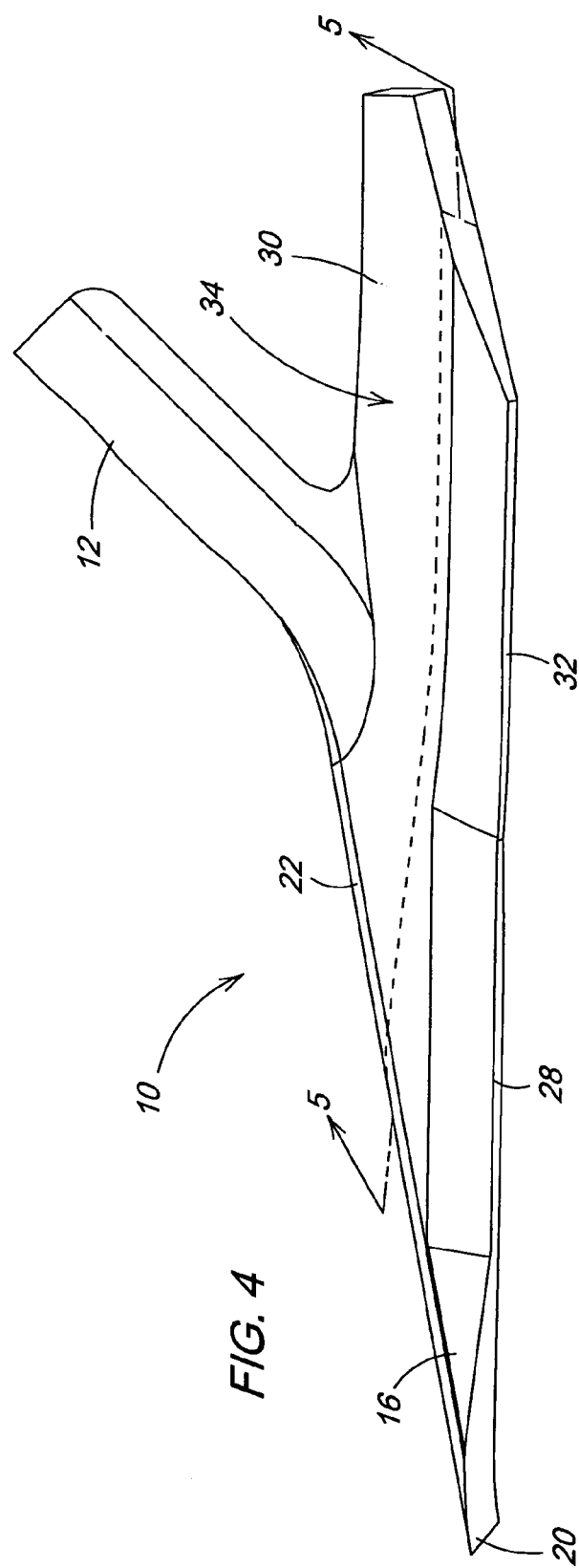
FIG. 4 is an enlarged side view of the tillage sweep of FIG. 1.
Figure 5:
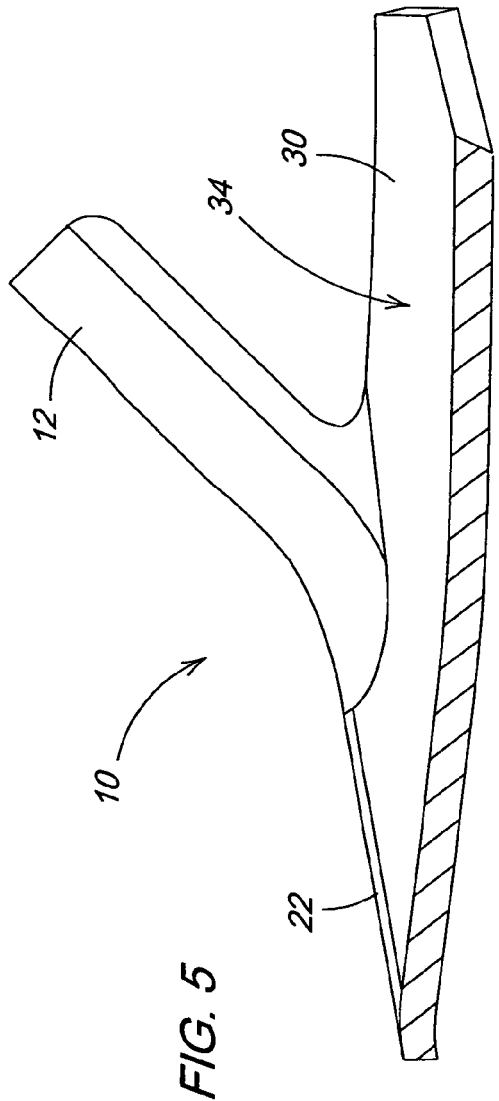
FIG. 5 is a view partially in section taken generally along lines 5-5 of FIG. 4.

Referring to the drawing figures, a tillage sweep 10 includes a connecting portion or stem 12 having a forwardly projecting nose portion 16 with leading edges 18 converging to a forwardmost point 20. A central rib 22 extends generally linearly from the point 20 to the base of the stem 12. A central body portion is defined by sides 24 extending outwardly and downwardly from the rib 22 at a shallow angle to opposite edges 28 which diverge in the rearward direction. In the embodiment shown, the edges 28 are straight and form an angle of about 45 degrees or less relative to each other.

Side blade structure or wings 30 extend outwardly and rearwardly from the body portion sides 24 on opposite sides of the stem 12. The wings 30 are identical and include generally straight side cutting edges 32, each of which forms an obtuse angle with the corresponding leading edge 28. The edges 28 and 32 as shown lie generally along a horizontal plane and form an angle of greater than about 160 degrees at their juncture. Although a particular sweep body, edge and wing construction is shown, it is to be understood that the present invention may also be utilized with sweeps of other constructions.

The wing 30 includes a non-flat upper soil-contacting and deflecting surface indicated at 34 which provides soil action that progressively increases in the rearward direction so that leading areas of the wing provide greater upward lift and lesser outward soil throw compared to trailing areas of the wing. As shown, the non-flat surfaces 34 of the wings 30 are slightly concave in the upward and outward direction to provide an effect that can be analogized to that of an angled skateboard ramp.

Figures 6, 7:
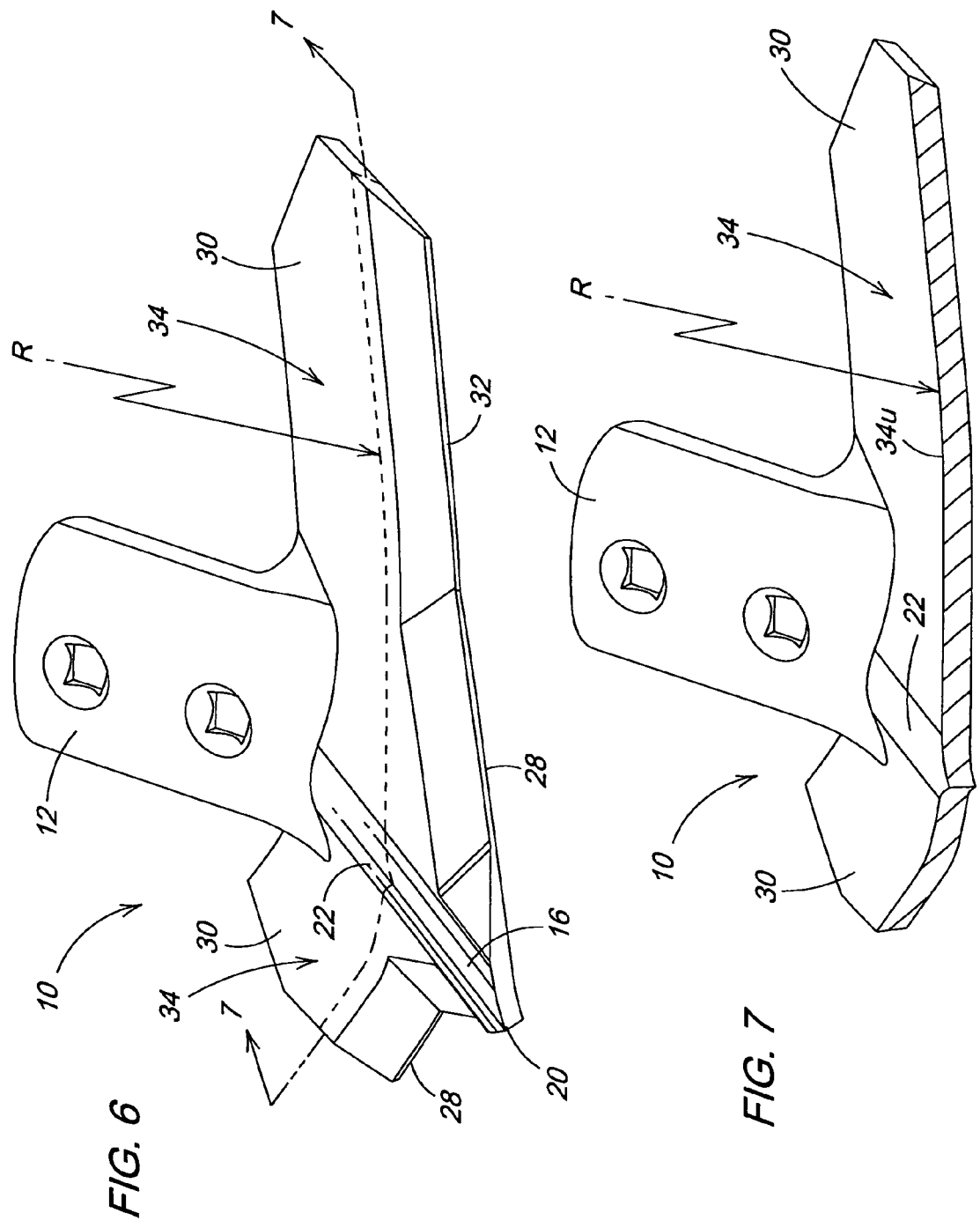
FIG. 6 is a front perspective view of the sweep illustrating the non-flat wing surface.
FIG. 7 is a view partially in section taken generally along lines 6-6 of FIG. 6.

As illustrated in FIGS. 6 and 7, the non-flat surface 34 has a generally arc-shaped curvature with a radius of curvature R centered above the sweep. Cross sections of the wing 30 taken along lines parallel to the edge 32 (FIG. 7) have an upper portions 34*u* that lie on the circumference of a circle of radius R. The radius R is relatively large compared to the sweep dimension and as shown is more than four times the length of the sweep from the point 20 to the aft edge of the wing 30. For a sweep having a length approaching ten inches, the radius R is approximately fifty inches. The relatively large radius provides a shallow concavity that progressively increases soil action from the forward portion of the wing 30 to the aft portion.

Figure 8:
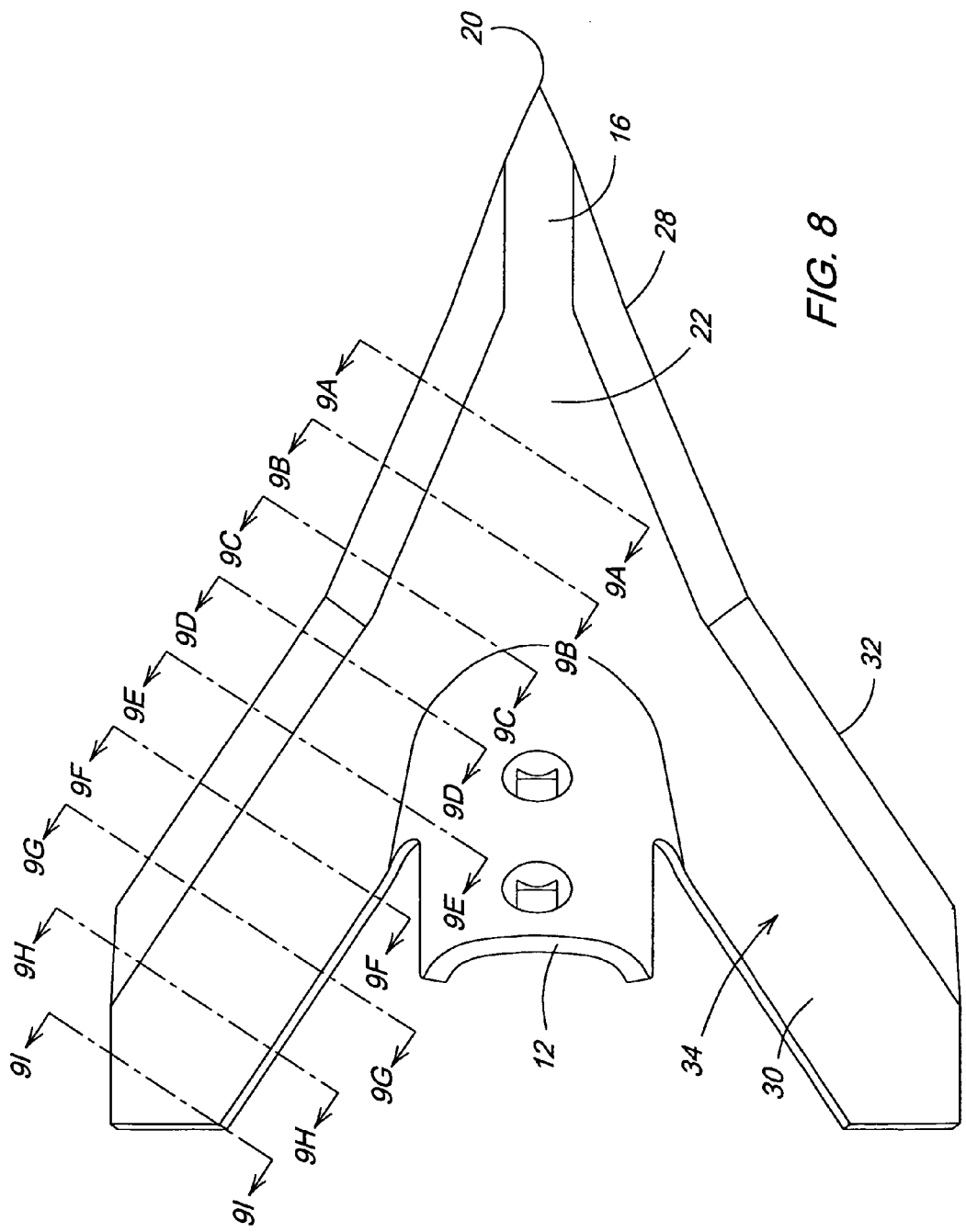
FIG. 8 is a view similar to FIG. 1.

As can best be appreciated from FIGS. 8 and 9 and the angle designations thereon, the body sides 24 are generally flat and are angled from the horizontal at an angle of less than thirty degrees (FIGS. 9A-9C). The angles of a substantial portion of the wing soil contacting surfaces from the horizontal, taken along lines approximately perpendicular to the edge 32, are also less than thirty degrees and slightly less than the angle of the body sides 24.

The progressive action provided by the sweep shape noticeable from the front to the rear of the sweep allows better upward and sideward soil flow at varying speeds and in varying soil conditions than a flat blade sweep. The soil is not only thrown on the sides of the sweep but is also thrown vertically to create a better soil surface uniformity and improve trash flow through the tillage machine.

The nose portion 16 provides greater upward lift and lesser outward soil throw compared to the trailing areas of the sweep 10. During high speed operation, substantial outward soil throw is provided by the nose portion 16, and the ramp effect of the non-flat surfaces 34 is diminished since the soil tends to lift more over the concavity. However, at slower speeds or in heavier soil conditions more soil engages the surfaces 34, and the ramp effect of the angled concavity provides additional outward throw of soil to facilitate soil and trash flow. The upward lift of the forward portion of the non-flat surfaces 34 improves soil penetration of the sweep 10. The overall surface shape also improves soil force load distribution for extended useful sweep life.

Having described the preferred embodiment, it will become apparent that various modifications can be made without departing from the scope of the invention as defined in the accompanying claims.

The invention claimed is:

1. An agricultural tillage sweep adapted for forward movement through soil, the sweep comprising:
   a stem portion;
   a leading nose portion extending forwardly from the stem portion and having outwardly directed soil contacting surfaces for lifting the soil and moving the soil outwardly around the stem portion;
   wing structure extending outwardly from the stem portion and rearwardly from the leading nose portion, the wing structure including upwardly directed wing surfaces extending outwardly from the leading nose portion towards outer ends of the wing rearwardly of leading wing edges, the surfaces having an upwardly and outwardly concave surface portion extending rearwardly from the nose portion outwardly of the stem portion, the concave surface portion extending along a substantial portion of the wing structure from an inward location outwardly of the stem portion, the concave surface having a radius of curvature centered above the sweep and providing increasing outward soil deflection in the rearward direction; and
   wherein the leading nose portion diverges in the rearward direction at an angle of less than 45 degrees and includes generally flat soil contacting surfaces forming an angle of less than 30 degrees with horizontal to provide primarily soil lifting action and secondarily outward soil deflection dependent on forward operating speed.

2. An agricultural tillage sweep adapted for forward movement through soil, the sweep comprising:
   a stem portion;
   a leading nose portion extending forwardly from the stem portion and having outwardly directed soil contacting surfaces for lifting the soil and moving the soil outwardly around the stem portion; and
   wing structure extending outwardly from the stem portion and rearwardly from the leading nose portion, the wing structure including upwardly directed wing surfaces extending outwardly from the leading nose portion towards outer ends of the wing rearwardly of leading wing edges, the surfaces having an upwardly and outwardly concave surface portion extending rearwardly from the nose portion outwardly of the stem portion, the concave surface portion extending along a substantial portion of the wing structure from an inward location outwardly of the stem portion, the concave surface having a radius of curvature centered above the sweep and providing increasing outward soil deflection in the rearward direction;
   wherein a cross section of the wing section taken generally parallel to the leading wing edge and through the concave surface portion is arc-shaped and opens upwardly; and
   wherein an upper extremity of a cross section of the wing structure taken generally along a line perpendicular to the front edge forms an angle with horizontal of less than 30 degrees.

3. The sweep as set forth in claim 2 wherein the leading nose portion includes generally flat soil contacting surfaces forming an angle of less than 30 degrees with horizontal.

4. An agricultural tillage sweep adapted for forward movement through soil, the sweep comprising:
   a stem portion;
   a leading nose portion extending forwardly from the stem portion and having outwardly directed soil contacting surfaces for lifting the soil and moving the soil outwardly around the stem portion;
   wing structure extending outwardly from the stem portion and rearwardly from the leading nose portion, the wing structure including upwardly directed wing surfaces extending outwardly from the leading nose portion towards outer ends of the wing rearwardly of leading wing edges, the surfaces having an upwardly and outwardly concave surface portion extending rearwardly from the nose portion outwardly of the stem portion, the concave surface portion extending along a substantial portion of the wing structure from an inward location outwardly of the stem portion, the concave surface having a radius of curvature centered above the sweep and providing increasing outward soil deflection in the rearward direction; and
   wherein the nose portion includes nose surfaces angled from horizontal less than 30 degrees to provide soil lift with some outward soil throwing action, the upwardly and outwardly concave surface portion providing soil throwing action in addition to the outward throwing action of the nose portion so that in operating conditions wherein soil lift from the nose surfaces is reduced, a ratio of soil thrown outwardly by the wing structure to soil thrown outwardly by the nose portion increases.

5. The sweep as set forth in claim 4 wherein the surface portion of the wing structure forms an angle with the horizontal of less than 30 degrees.

6. The sweep as set forth in claim 4 wherein the wing structure includes a front edge, and a cross section of the wing structure taken generally along a line perpendicular to the front edge includes an upper surface angle of less than 30 degrees.

7. An agricultural tillage sweep adapted for forward movement through soil at high speeds and at lower speeds substantially less than the high speeds, the sweep comprising:
   a stem portion;
   a leading nose portion extending forwardly from the stem portion and providing upward lift and some outward throw of soil at the high speeds;
   side blade structure having leading edges and extending outwardly and rearwardly from the leading nose portion, the side blade structure including soil deflecting blade surfaces extending outwardly from the stem portion, the soil deflecting blade surfaces located rearwardly of the leading edges and being coextensive with the leading edges, the soil deflecting blade surfaces centrally located between forward and aft extremities of the blade structure and being concave in the upward and outward direction to define an upper surface concavity along a substantial portion of the blade surfaces outwardly of the stem portion, the upper surface concavity having radius of curvature located above the sweep to increase outward throw of soil at the lower speeds to facilitate soil mixing action at both the high and low speeds without ridging of the soil; and
   wherein the nose portion includes rearwardly diverging soil deflecting surfaces forming angles of between 20 and 30 degrees with a horizontal plane, and wherein the side blade soil deflecting portions form angles of between 20 and 30 degrees with a horizontal plane.

8. The sweep as set forth in claim 7 wherein the side blade deflecting portion forms angles of slightly less than the angles formed by the nose portion deflecting surfaces.

\* \* \* \* \*